No. 685,077. Patented Oct. 22, 1901.
W. F. WILLIAMS.
ELASTIC TIRE.
(Application filed May 13, 1901.)
(No Model.)

Witnesses:

Inventor
William F. Williams
By Munn
Attorneys

UNITED STATES PATENT OFFICE.

WILLIAM FREDERICK WILLIAMS, OF LONDON, ENGLAND.

ELASTIC TIRE.

SPECIFICATION forming part of Letters Patent No. 685,077, dated October 22, 1901.

Application filed May 13, 1901. Serial No. 59,987. (No model.)

*To all whom it may concern:*

Be it known that I, WILLIAM FREDERICK WILLIAMS, gentleman, a subject of the King of Great Britain, residing at 17 and 18 Great Pulteney street, Golden Square, London, England, have invented new and useful Improvements in Elastic Tires, of which the following is a specification.

My invention relates to the manufacture of elastic tires of the solid or cushion type, and has for its object to so strengthen the material of which the tire is made as to enable it better to resist the strains to which such tires are subjected, particularly motor-car driving-wheel tires, which are liable to become lengthened by the circumferential tensional strain which comes upon them in propelling a heavy car up a steep hill, for example.

With the object of preventing such lengthening or tearing my invention consists, essentially, in embedding in the thickness of the tire cords or strands, which are knotted at frequent intervals, so as to obtain a multiplicity of mutually reinforcing points of abutment or resistance to tensional strain, the cords extending around the tire in the circumferential direction of the wheel and in one layer or in several separated layers located particularly toward the tread portion of the tire.

To these cords branch cords, also knotted at intervals, may be attached at frequent intervals, the branch cords diverging herring-bone or V wise, so as to reinforce the main strands.

My improvements are illustrated in the accompanying drawings, in which—

Figure 2:
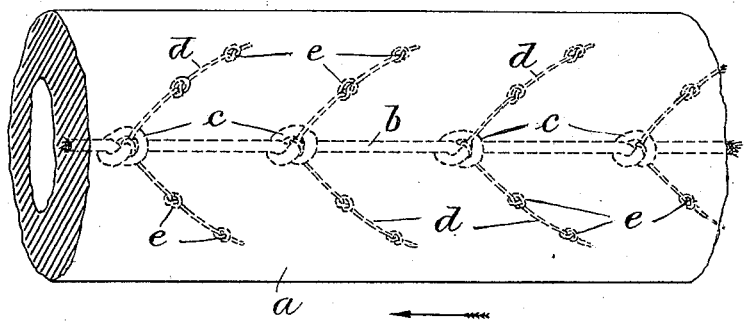
Figure 1:
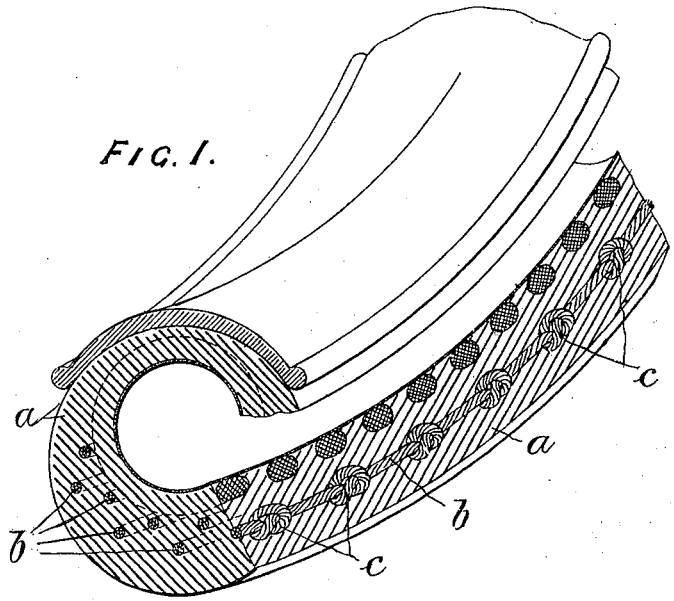

Figure 1 is a perspective view of a portion of a tire in longitudinal section, showing plain knotted cords embedded in the tread portion of the tire and extending circumferentially around the wheel. Fig. 2 is a plan view of the tread portion of a tire, showing the circumferential cords provided with branch cords.

Referring to Fig. 1, *a* is the rubber tire, made in any suitable way and of any desired form in cross-section and provided or not with an internal reinforcing-liner formed of stout cords extending in the transverse circumferential direction around the bore of the tire.

In the thickness of the rubber portion of the tire, and particularly in the tread portion, which bears on the ground, are embedded strong cords *b*, knotted, as at *c*, at frequent intervals, these cords being spaced at suitable angular distances apart in the section of the tire and in one, two, or more superposed layers or circles at different distances from the outer surface. These cords *b* are embedded in the plastic rubber in the operation of making the tire, and they may either be separate cords, each cord having its ends knotted or otherwise joined together, so as to form a complete annulus in the circumferential direction of the wheel, or the several cords *b* might be formed of one continuous piece of cord wound continuously around the tire in the circumferential direction thereof in the operation of making the tire.

In order to reinforce the cords *b* and increase the resistance to circumferential tensional strain, there may be attached to each or any of the cords *b* at each or any of the knots *c* branch cords *d*, diverging V-wise from the main cord *b*, each pair of branch cords being preferably formed of a length of cord knotted by the middle of its length to the cord *b* and each branch member having knots *e* in it to increase the hold. These branch cords extend in the transverse circumferential direction of the tire and circumferentially of the wheel in such direction relatively to the direction in which the wheel is to be rotated when driven, as indicated by the arrow, that the branch cords will supplement the resistance afforded to the cords *b* by the knots *c* and by distributing the strain in the longitudinal and transverse circumferential directions prevent such excessive strain coming on any of the knots *c* as would tend to tear them out of the rubber. The branch cords *d* also serve to strengthen the tire in the transverse circumferential direction.

I claim—

1. An elastic tire having embedded in its thickness cords or strands knotted at frequent intervals and encircling the tire in the circumferential direction of the wheel, there being one or several superposed layers or circles of such knotted cords, so as to resist the stretching of the tire under circumferential driving strains, as described.

2. An elastic tire having embedded in its thickness cords or strands knotted at frequent intervals and encircling the tire in the circumferential direction of the wheel, there being one or several superposed layers or circles of such knotted cords each having attached branch cords diverging therefrom V-wise and knotted, so as to reinforce the primary cords, and strengthen the tire both in the longitudinal and transverse circumferential direction as described.

WILLIAM FREDERICK WILLIAMS.

Witnesses:
 THOMAS W. KENNARD,
 C. G. CLARK.